Jan. 12, 1954  W. E. FORD  2,665,521
WHEEL FOR MODELS AND TOYS
Filed Sept. 20, 1948

INVENTOR.
William E. Ford
BY Elwin A. Andrus
Attorney

Patented Jan. 12, 1954

2,665,521

UNITED STATES PATENT OFFICE 2,665,521

WHEEL FOR MODELS AND TOYS

William E. Ford, Milwaukee, Wis., assignor to Product Miniature Company, Milwaukee, Wis., a corporation of Wisconsin Application September 20, 1948, Serial No. 52,361

3 Claims. (Cl. 46—221)

This invention relates to the construction of wheels for models and toys.

The invention provides a construction particularly applicable to small wheels simulating the appearance of various types of automobile and tractor wheels and in which a tire is employed.

The molding of such wheels in one piece is generally unsatisfactory since it is impossible to provide the desired distinguishing color between the tire and the body of the wheel. Also if soft rubber-like material suitable for the tire is used it is unsuitable for the body of the wheel and to support the axle, and if a hard material suitable for the body of the wheel is used it is unsuitable for the tire.

Heretofore, it has been the practice to mold a wheel entirely of rubber or a rubber tire to be mounted upon a metal wheel body. It is difficult to mold either a rubber tire or wheel without producing a substantial flash that presents a problem in trimming after vulcanization.

The present invention is based upon the discovery that two different types of synthetic plastics may be employed in molding the wheel, whereby the difficulties of the former constructions are eliminated.

The tire is made of a semi-resilient, elastomeric material which is suitable for injection molding, such as vinyl chloride-acetate copolymer, one form of which is sold on the market as "Vinylite."

The body of the wheel is injection molded of any suitable thermo-plastic such as cellulose acetate, ethyl cellulose or polystyrene which have flow characteristics suitable for injection molding.

The tire material is generally black and the wheel body material is colored to match the desired color scheme for the particular article utilizing the wheel. The design of the wheel is generally made to simulate closely the design of the larger wheel.

A representative wheel is illustrated in the accompanying drawing in which.

Figure 1:
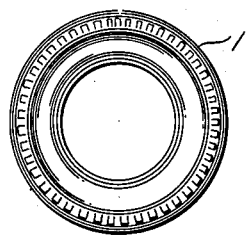
Figure 1 is a side elevation of the tire after injection molding of the same.
Figure 2:
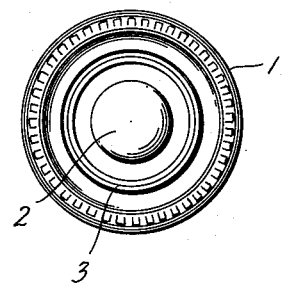
Fig. 2 is a similar elevation of the completed wheel.
Figure 3:
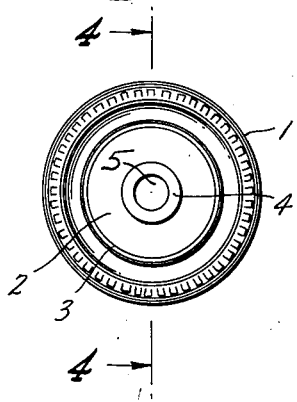
Fig. 3 is an elevation of the opposite side of the wheel.
Figure 4:
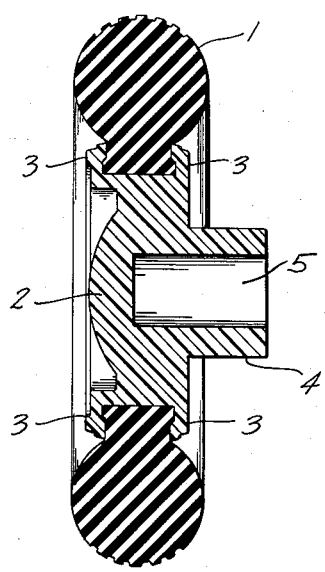
Fig. 4 is a detail transverse section taken on radial line 4—4 of Fig. 3.
Figure 5:
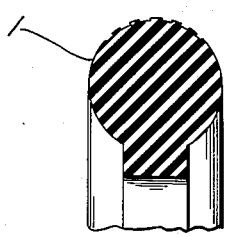
Fig. 5 is a similar section through the tire prior to molding the wheel body therewith.

The wheel illustrated is constructed to simulate a wheel for a recent model of automobile. The shape of the wheel corresponds very closely with the shape of the automobile wheel so that the molded wheel can be employed on a miniature model of the automobile.

In constructing the wheel, the tire 1 is first injection molded from the vinyl chloride acetate or similar plastic composition.

Then the wheel body 2 is injection molded in the central opening through the tire, utilizing the tire as a part of the mold or die.

The wheel body is provided with two side flanges 3 which are spaced to receive the inner edge of the tire and which grip the tire to obtain the desired integral characteristics for the wheel whereby the tire does not become loose.

In molding the wheel body care should be taken not to unduly compress the tire by the die, and to support the tire against undue expansion or distortion by the pressure of the thermo-plastic material during molding of the wheel body. The tire should be left free with just the right amount of resilience to grip the wheel body upon shrinkage of the latter. In general, the inwardly projecting inner edge portion of the tire adjacent the round section will be clamped tightly by projecting edge parts of the die which locally compress the tire during the body molding process and form the uniform flanges 3 for gripping the tire.

A double grip is obtained between the tire and wheel body by reason of the radial resilience of the tire exerting a radial gripping action upon the rim of said wheel body, and of the slight shrinkage of the wheel body upon cooling exerting a clamping force upon the inner edge of the tire by the flanges 3.

The wheel body 2 is generally provided with a hub 4 on its inner side with a central hole 5 therein for receiving a suitable axle, not shown.

The wheel can be produced in much less time and with less cost than former wheels. It is more easily adapted as to shape and appearance and provides a simulation for modeling purposes that is far superior to former wheel constructions.

Various embodiments of the invention may be employed within the scope of the accompanying claims.

I claim:

1. A wheel mountable for rotation upon a single axis and comprising a tire of semi-resilient elastomeric molded material, and a central wheel body of hard injection molded thermo-plastic material having a central hub axially thereof for rotatably mounting the same, said tire constituting one part of the mold for said wheel body whereby the latter is formed in intimate outward pressure engagement with said tire and maintains the tire in tension to effect a grip of the tire upon the wheel body.

2. A wheel mountable for rotation upon a single axis and comprising a tire of semi-resilient elastomeric molded material having an inwardly extending flange portion provided with annular surfaces for securing the same in place, and a central wheel body of hard injection molded thermo-plastic material having a pair of laterally spaced circumferential flanges confining the inner flange portion of said tire and having a central hub axially thereof for rotatably mounting the same, said wheel body being formed under pressure against the tire while compressing the latter, and the shrinkage of said wheel body after forming effecting a grip of said tire by said flanges.

3. A wheel mountable for rotation upon a single axis and comprising a tire of semi-resilient vinyl chloride-acetate copolymer having an inwardly extending flange portion provided with annular surfaces for securing the same in place, and a central wheel body of hard injection molded thermo-plastic ethyl cellulose having a pair of laterally spaced circumferential flanges confining the inner flange portion of said tire and having a central hub axially thereof for rotatably mounting the same, said tire constituting one part of the mold for said wheel body whereby the latter is formed in intimate outward pressure engagement with said tire, and the wheel body having a shrink fit by said flanges against the tire, the shrinkage of said wheel body radially being insufficient to relieve the circumferential tension upon the tire effected by the molding of said wheel body.

WILLIAM E. FORD.

References Cited in the file of this patent

UNITED STATES PATENTS

| Number | Name | Date |
|---|---|---|
| Re. 16,766 | Riblet | Oct. 11, 1927 |
| 437,998 | Kenny | Oct. 7, 1890 |
| 522,791 | Hubbell | July 10, 1894 |
| 545,578 | Burt | Sept. 3, 1895 |
| 634,597 | Warren | Oct. 10, 1899 |
| 701,492 | Matthes | June 3, 1902 |
| 721,038 | Haring | Feb. 17, 1903 |
| 1,442,242 | Atwood | Jan. 16, 1923 |
| 1,532,725 | Atwood et al. | Apr. 7, 1925 |
| 1,645,089 | Burdette | Oct. 11, 1927 |
| 1,680,823 | Teed | Aug. 14, 1928 |
| 1,707,815 | Robb | Apr. 2, 1929 |
| 1,708,969 | Gill | Apr. 16, 1929 |
| 2,044,914 | Miller | June 23, 1936 |
| 2,135,380 | Benge | Nov. 1, 1938 |
| 2,279,208 | Shaw | Apr. 7, 1942 |
| 2,307,874 | Bilde | Jan. 12, 1943 |
| 2,422,266 | Steinke | June 17, 1947 |
| 2,587,082 | Albisetti | Feb. 26, 1952 |